United States Patent
Chen

(10) Patent No.: US 7,323,984 B2
(45) Date of Patent: Jan. 29, 2008

(54) TV REMOTE CONTROL WITH GUIDED SEARCH FUNCTION

(75) Inventor: Chien-Cheng Chen, Taipei (TW)

(73) Assignee: Inventec Corporation, Taipei (TW)

( * ) Notice: Subject to any disclaimer, the term of this patent is extended or adjusted under 35 U.S.C. 154(b) by 155 days.

(21) Appl. No.: 11/364,333

(22) Filed: Mar. 1, 2006

(65) Prior Publication Data

US 2007/0205892 A1    Sep. 6, 2007

(51) Int. Cl.
*G08B 1/08* (2006.01)
(52) U.S. Cl. .................. 340/539.32; 340/825.72; 340/825.36; 340/825.69; 340/539.13; 348/734
(58) Field of Classification Search .......... 340/539.32, 340/825.72, 825.36, 825.69, 539.13, 539.15, 340/825.49, 5.61, 571, 539.1, 692; 348/734
See application file for complete search history.

(56) References Cited

U.S. PATENT DOCUMENTS

| | | | | |
|---|---|---|---|---|
| 5,598,143 A | * | 1/1997 | Wentz | 340/539.32 |
| 5,677,673 A | * | 10/1997 | Kipnis | 340/539.32 |
| 5,686,891 A | * | 11/1997 | Sacca et al. | 340/571 |
| 6,445,290 B1 | * | 9/2002 | Fingal et al. | 340/539.32 |
| 6,573,832 B1 | * | 6/2003 | Fugere-Ramirez | 340/539.13 |

FOREIGN PATENT DOCUMENTS

TW    277194    10/1984
TW    M268824   12/1993

* cited by examiner

*Primary Examiner*—Anh V. La
(74) *Attorney, Agent, or Firm*—Birch, Stewart, Kolasch & Birch, LLP

(57) ABSTRACT

A TV remote control with a guided search function is provided, which comprises: a call sensing module, for sensing a trigger signal, and generating a corresponding control signal; a search times calculating module, for continually receiving the control signal, and accumulating a search times value according to the receive times; an alarm module, for receiving the control signal, and sending an alarm signal in response, to indicate the position of the remote control for the user; and an alarm signal adjusting module, for adjusting the alarm signal sent by the alarm module according to the accumulated search times value, thereby solving the problem of looking for the remote control.

10 Claims, 2 Drawing Sheets

TV REMOTE CONTROL WITH GUIDED SEARCH FUNCTION

BACKGROUND OF THE INVENTION

1. Field of Invention

The present invention relates to a remote control, and more particularly to a TV remote control with a guided search function.

2. Related Art

With the development of wireless technology, users can control electronic products from a long distance with remote controls. And most remote controls are designed to be short, small, light, and thin for facilitating operation by users. However, the remote control is frequently placed in various places along with users' moving, and thus the remote control is often hard to find.

Referring to ROC Patent Publication NO. M268824, an electronic product with a function for searching a remote control is disclosed, which comprises an electronic product, and a remote control which can remotely control the electronic product. The electronic product has a first control circuit for sending a wireless signal, and a switch element for actuating the first control circuit to send the wireless signal. The remote control has a second control circuit for receiving the wireless signal, and an alarm actuated by the second control circuit to send an alarm signal. The position of the remote control can be recognized through receiving a search signal sent by the electronic product timely, such that the position of the remote control can be indicated for the users immediately.

The position of the remote control may be found through the alarm with an alarm signal, however, if the remote control is placed in a drawer or other place out of sight, it cannot be found out. Furthermore, the position of the remote control can be recognized through the sound sent by a buzzer, but the volume thereof provides different alarm signals according to different distances between the remote control and the electronic product, and therefore, when the remote control is far from the user, it is hard for the user to recognize.

Referring to ROC Patent Publication NO. 277194, a remote control with an anti-loss function and system thereof are disclosed, the remote control comprising: an input interface unit, a first wireless transceiver unit, a microcomputing control unit, a memory unit, and an audio device. A remote control system with an anti-loss function can be formed by the remote control together with an electronic device. When the distance between the remote control and the electronic device exceeds a certain value, the remote control will send a sound, to prevent the loss of the remote control.

When the remote control is carried beyond a distance from the electronic device, the remote control would send an alarm sound to indicate this for the user. However, the remote control and the electronic device must keep communicating with each other; in other words, the remote control must consume electric power in communication, and therefore, the batteries of the remote control must be changed or charged after being used for a time, which is inconvenient.

Therefore, it has become one of the problems to be solved by researchers how to provide a TV remote control with a guided search function, for indicating the position of the remote control for the user by a strong alarm signal, to solve the problem of looking for the remote control.

SUMMARY OF THE INVENTION

In view of the above problems, a main object of the present invention is to provide a TV remote control with a guided search function, wherein the position of the remote control can be recognized by users through the guidance of alarm signals of different levels, thereby solving the problem of looking for the remote control.

Therefore, to achieve the above object, the TV remote control with a guided search function disclosed in the present invention generates an alarm signal in response to a trigger signal sent by a searching key module disposed on a TV set, for users to recognize the position of the remote control. The remote control comprises: a call sensing module, for sensing the trigger signal, and generating a corresponding control signal; a search times calculating module, for continually receiving the control signal, and accumulating a search times value according to the times of receiving the control signal; an alarm module, for receiving the control signal, and sending an alarm signal (e.g. a flickering light and/or an audio sound) in response, to indicate the position of the remote control for the user; and an alarm signal adjusting module, for adjusting the alarm signal sent by the alarm module according to the accumulated search times value.

Furthermore, to achieve the above object, the TV remote control with a guided search function disclosed in the present invention generates an alarm signal in response to the trigger signal sent by the searching key module disposed on the TV set, for users to recognize the position of the remote control. The TV remote control comprises: a call sensing module, for sensing the trigger signal, and generating a corresponding control signal; a search times calculating module, for continually receiving the control signal, and accumulating a search times value according to the times of receiving the control signal; an alarm module, for receiving a control signal, and sending an alarm signal (e.g. a flickering light and/or an audio sound) in response, to indicate the position of the remote control for the user; an alarm signal adjusting module, for adjusting the alarm signal by the alarm module according to the accumulated search times value; a clear key module, for the user to shut down the alarm signal sent by the alarm module; and a timer module, for beginning to time for a predetermined time when the alarm signal is sent by the alarm module, and sending a clear signal to the clear key module after the predetermined time, to shut down the alarm signal sent by the alarm module.

By using the TV remote control with a guided search function, the position of the remote control can be recognized quickly by the users, and also the alarm signal is adjusted according to the search times, to guide the users to find the position of the remote control, thereby solving the problem of looking for the remote control.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
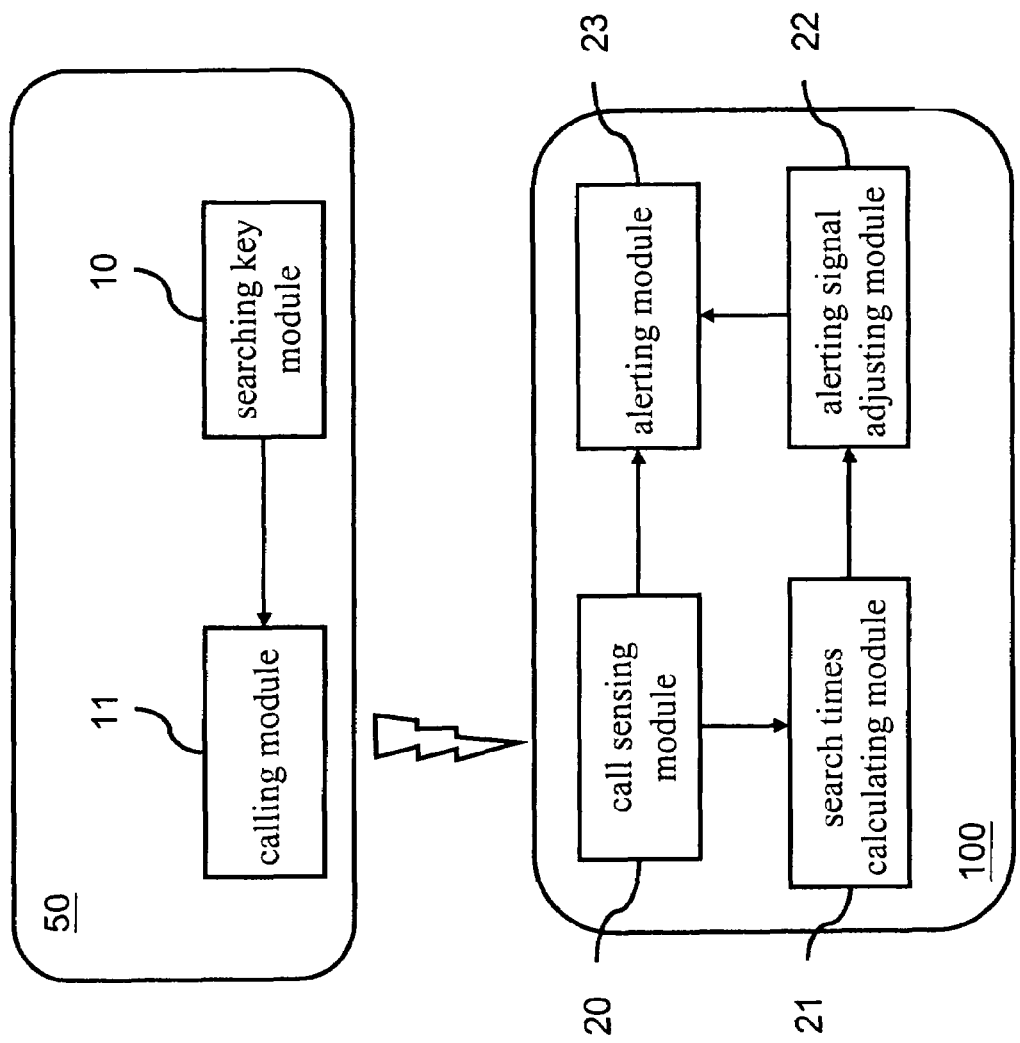
FIG. 1A is a systematic block diagram of a first embodiment of the present invention.

Referring to FIG. 1A, it is a systematic block diagram of a first embodiment of the present invention. As the TV set 50 in the first embodiment of the present invention may adopt the common cathode ray tube (CRT), liquid crystal display (LCD), or plasma display panel (PDP), the other circuit modules in the TV set 50 are not shown or illustrated. The TV set 50 at least comprises a searching key module 10 and a call module 11.

The searching key module 10 has a signal decoding circuit (not shown), and generates a trigger signal after being operated (e.g. pressed) by a user. In practice, the searching key module 10 may adopt touch keys or mechanical keys, and a search key can be set near the housing or the control panel of the body of the TV set 50, to facilitate the user's operation.

The call module 11 is connected with the searching key module 10 and has a signal transmitting circuit (not shown), for converting the trigger signal generated by the searching key module 10 to a wireless signal form and transmitting it. The transmitted trigger signal is an omnidirectional wireless signal with no particular direction, such that the trigger signal can be transmitted to the remote control 100 in an unknown position, wherein the frequency of the trigger signal is different from the frequency of the remote operation, thereby preventing the error control of the TV set 50.

The remote control 100 comprises: a call sensing module 20, a search times calculating module 21, an alarm signal adjusting module 22, and an alarm module 23.

The call sensing module 20 has a wireless signal sensing circuit (not shown), for sensing the trigger signal sent by the call module 11, and generating a corresponding control signal after sensing the trigger signal. In practice, the call module 11 and the call sensing module 20 are achieved by communication circuits in conformity with the communication protocol IEEE802.11a, IEEE802.11b, or IEEE802.11g. Furthermore, the call sensing module 20 may perform sensing by listening to the trigger signal channel at every lapse of a predetermined time interval, to prevent the remote control 100 from consuming too much electric power in the sensing operation.

The search times calculating module 21 is connected with the call sensing module 20 and has a counter circuit (not shown), for continually receiving the control signal generated by the call sensing module 20, and accumulating a search times value according to the times of receiving the control signal.

The alarm signal adjusting module 22 is connected with the search times calculating module 21, and has predetermined alarm states of different levels. After the search times value reaches a predetermined times value, the alarm signal adjusting module 22 generates an alarm signal adjusting signal, to adjust the alarm state correspondingly, and generates a corresponding control signal according to different alarm states, to control the alarm signal sent by the alarm module 23, wherein the alarm state may be classified as follows.

A first level alarm state, enabling the alarm module 23 to generate a flickering light with a first flicker frequency, or an audio sound with a first buzzer frequency.

A second level alarm state, enabling the alarm module 23 to generate a flickering light with a first flicker frequency, and an audio sound with a first buzzer frequency.

A third level alarm state, enabling the alarm module 23 to generate a flickering light with a second flicker frequency, and an audio sound with a second buzzer frequency, wherein the second flicker frequency and the second buzzer frequency are both a maximum value, that is to say, the alarm signal is the strongest.

The alarm module 23 is connected with the alarm signal adjusting module 22, and has a light generating circuit (not shown) and an audio generating circuit (not shown), for receiving the control signals sent by the alarm signal adjusting module 22 and the call sensing module 20, and sending the alarm signal (e.g. the flickering light or the audio sound) correspondingly, to indicate the position of the remote control 100 for the user.

Figure 1B:
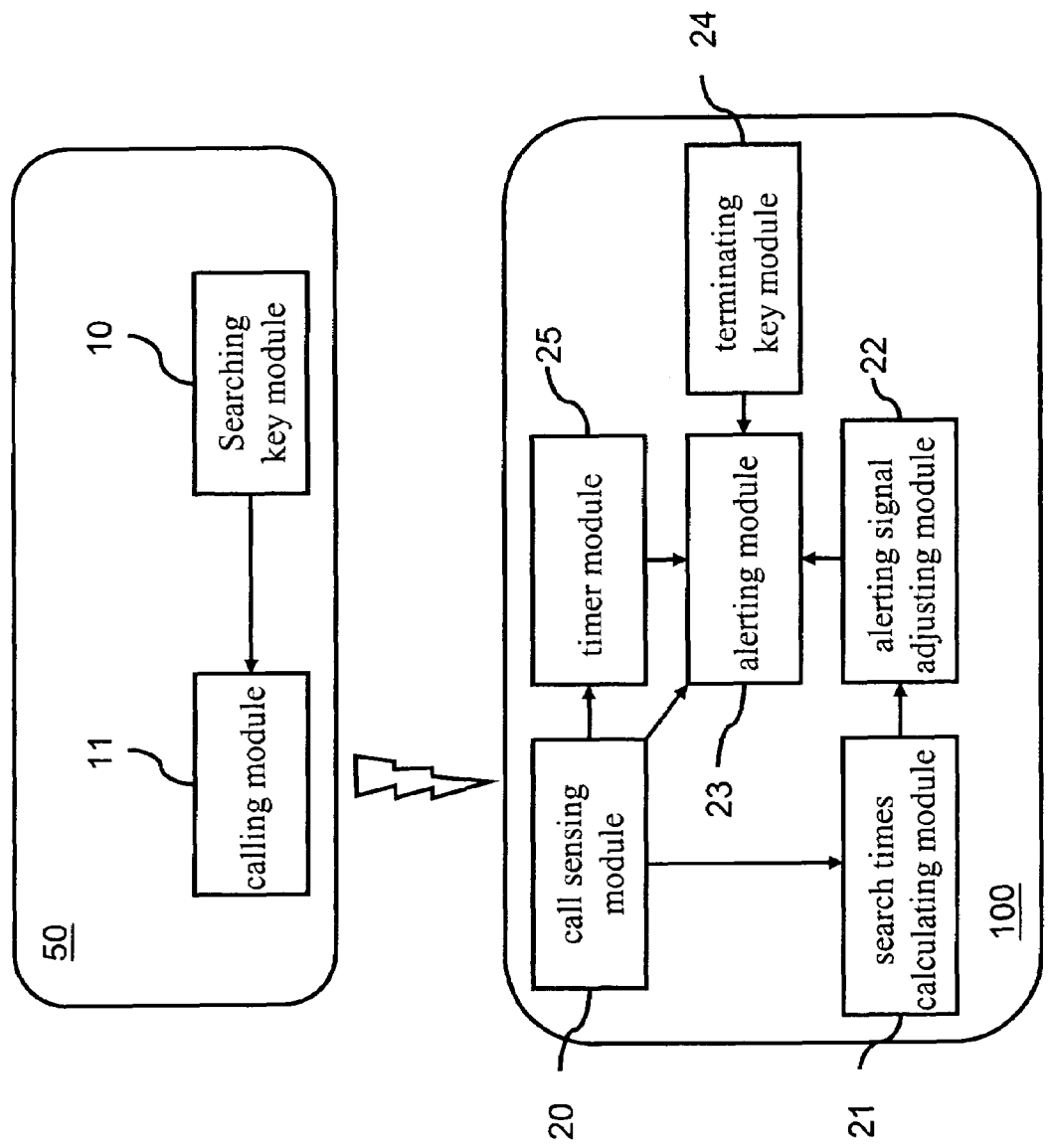
FIG. 1B is a systematic block diagram of a second embodiment of the present invention.

Referring to FIG. 1B, it is a systematic block diagram of a second embodiment of the present invention. The TV set 50 in the second embodiment of the present invention adopts the common CRT, LCD, or PDP, and thus the other circuit modules inside the TV set 50 are not shown or illustrated. The TV set 50 at least comprises a searching key module 10 and a call module 11.

The searching key module 10 has a signal decoding circuit (not shown), and generates a trigger signal after being operated (e.g. pressed) by the user. In practice, the searching key module 10 may adopt touch keys or mechanical keys, and a search key can be set near the housing or the control panel of the body of the TV set 50, to facilitate the user's operation.

The call module 11 is connected with the searching key module 10, and has a signal transmitting circuit (not shown), for converting the trigger signal generated by the searching key module 10 to a wireless signal form and transmitting it. The transmitted trigger signal is an omnidirectional wireless signal with no particular direction, such that the trigger signal can be transmitted to the remote control 100 of an unknown position, wherein the frequency of the trigger signal is different from the frequency of the remote operation, thereby preventing the error control of the TV set 50.

The remote control 100 comprises: a call sensing module 20, a search times calculating module 21, an alarm signal adjusting module 22, and an alarm module 23.

The call sensing module 20 has a wireless signal sensing circuit (not shown), for sensing the trigger signal sent by the call module 11, and generating a corresponding control signal after sensing the trigger signal. In practice, the call module 11 and the call sensing module 20 are achieved by communication circuits in conformity with the communication protocol IEEE802.11a, IEEE802.11b, or IEEE802.11g. Furthermore, the call sensing module 20 may perform sensing by listening the trigger signal channel every a predetermined time, to prevent the remote control 100 from consuming overmuch electric power in the sensing operation.

The search times calculating module 21 is connected with the call sensing module 20 and has a counter circuit (not shown), for continually receiving the control signal by the call sensing module 20, and accumulating a search times value according to the times of receiving the control signal.

The alarm signal adjusting module 22 is connected with the search times calculating module 21, and has predetermined alarm states of different levels. After the search times value reaches a predetermined times value, the alarm signal adjusting module 22 generates an alarm signal adjusting signal, to adjust the alarm state correspondingly, and generates a corresponding control signal according to different alarm states, to control the alarm signal sent by the alarm module 23, wherein the alarm state may be classified as follows.

A first level alarm state, enabling the alarm module 23 to generate a flickering light with a first flicker frequency, or an audio sound with a first buzzer frequency.

A second level alarm state, enabling the alarm module 23 to generate a flickering light with a first flicker frequency, and an audio sound with a first buzzer frequency.

A third level alarm state, enabling the alarm module 23 to generate a flickering light with a second flicker frequency, and an audio sound with a second buzzer frequency, wherein the second flicker frequency and the second buzzer frequency are both a maximum value, that is to say, the alarm signal is strongest.

The alarm module 23 is connected with the alarm signal adjusting module 22, and has a light generating circuit (not shown) and an audio generating circuit (not shown), for receiving the control signals sent by the alarm signal adjusting module 22 and the call sensing module 20, and sending the alarm signal (e.g. the flickering light or the audio sound) correspondingly, to indicate the position of the remote control 100 for the user.

The clear key module 24 is connected with the alarm module 23, and has a signal rest circuit (not shown), for shutting down the alarm signal of the alarm module 23. After being operated, the clear key module 24 transmits a reset signal to the alarm module 23, to shut down the alarm signal.

The timer module 25 is connected with the call sensing module 20 and the alarm module 23 respectively. The timer module 25 begins to time for a predetermined time, after an alarm signal is sent by the alarm module 23. And after the predetermined time, the timer module 25 transmits a clear signal to the clear key module 24, such that the clear key module 24 generates a reset signal to the alarm module 23, thereby shutting down the alarm module 23. In such a way, the remote control 100 can be prevented from running out of electricity because of continually sending the alarm signal.

By using the TV remote control with a guided search function, alarm signals of different levels can be generated according to the search times, to guide the user to find the position of the remote control quickly, thereby solving the problem of looking for the remote control.

The invention being thus described, it will be obvious that the same may be varied in many ways. Such variations are not to be regarded as a departure by the spirit and scope of the invention, and all such modifications as would be obvious to one skilled in the art are intended to be included within the scope of the following claims.

What is claimed is:

1. A TV remote control with a guided search function, generating an alarm signal in response to a trigger signal sent by a searching key module disposed on a TV set, for a user to recognize the position of the remote control, comprising:

a call sensing module, for sensing the trigger signal, and generating a corresponding control signal;

a search times calculating module, for continually receiving the control signal and accumulating a search times value according to the times of receiving the control signal;

an alarm module, for receiving the control signal, and sending the alarm signal in response, to indicate the position of the remote control for the user; and an alarm signal adjusting module, for adjusting the alarm signal sent by the alarm module according to the accumulated search times value.

2. The TV remote control with a guided search function as claimed in claim 1, wherein the trigger signal is an omnidirectional wireless signal.

3. The TV remote control with a guided search function as claimed in claim 1, wherein the alarm signal is a flickering light or an audio sound.

4. The TV remote control with a guided search function as claimed in claim 1, wherein the alarm signal is a flickering light and an audio sound.

5. The TV remote control with a guided search function as claimed in claim 1, wherein after the search times value exceeds a predetermined value, the alarm signal sent by the alarm module is strengthened.

6. A TV remote control with a guided search function, generating an alarm signal in response to a trigger signal sent by a searching key module disposed on a TV set, for a user to recognize the position of the remote control, comprising:

a call sensing module, for sensing the trigger signal, and generating a corresponding control signal;

a search times calculating module, for continually receiving the control signal and accumulating a search times value according to the times of receiving the control signal;

an alarm module, for receiving the control signal, and sending the alarm signal in response, to indicate the position of the remote control for the user;

an alarm signal adjusting module, for adjusting the alarm signal sent by the alarm module according to the accumulated search times value;

a clear key module, for shutting down the alarm signal sent by the alarm module; and a timer module, for beginning to time for a predetermined time after the alarm signal is sent by the alarm module, and sending a clear signal to the clear key module after the predetermined time, to shut down the alarm signal sent by the alarm module.

7. The TV remote control with a guided search function as claimed in claim 6, wherein the trigger signal is an omnidirectional wireless signal.

8. The TV remote control with a guided search function as claimed in claim 6, wherein the alarm signal is a flickering light or an audio sound.

9. The TV remote control with a guided search function as claimed in claim 6, wherein the alarm signal is a flickering light and an audio sound.

10. The TV remote control with a guided search function as claimed in claim 6, wherein after the search times value exceeds a predetermined value, the alarm signal sent by the alarm module is strengthened.

* * * * *